3,238,376
REGULATING SYSTEM FOR TURBINES
Dietrich Ernst and Claus Kessler, Erlangen, Germany, assignors to Siemens-Schuckertwerke Aktiengesellschaft, Berlin-Siemensstadt and Erlangen, Germany
Filed Aug. 19, 1963, Ser. No. 302,812
Claims priority, application Germany, Aug. 18, 1962, S 80,987
10 Claims. (Cl. 290—4)

Our invention relates to a system for regulating the operation of turbines in power plants in dependence upon varying demands and other plant-operating conditions.

Known steam turbine regulating systems, for example those turning an electric synchronous generator, regulate the speed of the turbine by means of a single-feedback path. For improving the static and dynamic performance of such turbines, it has been proposed to depart from such a single-feedback system by providing, in subordination to the turbine-speed regulating path a component regulator path (secondary feedback loop) for determining the opening of the control members, such as the steam valves, that admit the driving power to the turbine. In both regulating or feedback paths of such a system, the behavior of the machine assembly is controlled by the speed regulating component of the system. Where the electric generator, in compound with many others energizes a large distribution network, the turbine speed is determined by the synchronizing moments of the line frequency and thus is fixed by that frequency. A change in the datum (reference) value of the speed regulator, therefore, cannot produce a change in turbine speed but can only change the power output according to the static characteristic. Only where the synchronous generator operates separately from a compound distribution network or in a small insular distribution network, is speed regulation effectively realized and necessary.

Employing the speed regulating feedback for two purposes, namely for regulating the turbine speed from about one-tenth of the rated speed upward, and also for controlling the power output, entails fundamental disadvantages. Thus, the range of adjustable datum values must be large, but the adjustment change must nevertheless occur in very finely graduated steps because a change in power output from zero up to rated power must be controllable by a shift in datum value of about 4% and less relative to the value corresponding to the line frequency. This requires high step-down ratio mechanical transmissions which produce long regulating delays; that is, particular changes in power demand can be satisfied only after an undesirably long time delay. Furthermore, one and the same regulating system of the known type cannot satisfy the different requirements prevailing when the synchronous generator operates alone, i.e. upon a non-rigid distribution network so that a pure speed regulation takes place, as well as when it operates in compound on a frequency-rigid distribution network and the speed regulator controls only the power output of the plant.

In addition, a speed regulating feedback system cannot respond fully to some plant-operational criteria if the turbine is required to furnish different powers in response to a variety of datum-value commands, for example in response to changes in fresh-steam temperature, fresh-steam pressure, pole-wheel angle of the alternator, and others.

It is an object of our invention to minimize or eliminate shortcomings of the above-mentioned type.

Our invention is based upon the concept of relieving the speed regulating feedback of those tasks remote from its fundamental purpose, namely of controlling power output during compound operation. According to a feature of our invention, during compound operation we substitute the speed-regulator performance by other associated or component regulating feedback loops that directly respond to the respective sensed pilot magnitudes and then cause corresponding control commands to be issued to the admission valves.

More specifically, according to our invention we provide a system for turbine regulation in which an electro-hydraulic regulator which controls the opening of the control members (valves) for admitting power medium to the turbine, is joined with, and selectively subsidiary to, at least two other component regulating feedback loops or circuits which are mutually interlinked so that each becomes substituted for the other in dependence upon given plant-operating conditions, one of these interlinked regulating circuits being a speed regulator and hence responsive to turbine speed, whereas the other component regulator circuit or circuits respond to different plant-operation criteria.

Preferably a discriminator network controls substitution of one of the component regulating circuits operating upon the admittance control member for another so that at any time the component regulating circuit prescribing the smallest admittance opening of the control member is in operation. Since here the other component-regulating circuits would, if operating, prescribe a larger admittance opening than the component system normally active these other component-regulating circuits are always ready to become active as soon as the operating circuit causes the pilot signal of such other regulating system to approach a predetermined limit of its datum value. Thus the regulating system can readily respond to different plant-operation criteria having any desired mutual relationship or interdependency.

According to a preferred embodiment of the invention, we provide an additional component regulating circuit whose pilot input is the pole-wheel angle of the synchronous generator driven from the turbine being regulated. The datum (reference) value of this component regulating circuit is then adjusted to a magnitude corresponding to the critical limit angle or, if desired, to a somewhat different magnitude which takes a given safety distance into account. During normal operation of the plant in which the magnitude of the pole-wheel angle is smaller than the adjusted datum limit value, the pole-wheel angle regulator furnishes an output signal far larger than that furnished by the component regulator circuit then operating upon the control member of the steam admission valve, the latter regulator being generally the one responsive to the power output for maintaining the generated power within given constancy limits. However, when the pole-wheel angle approaches its limit value, the output signal of the pole-wheel angle regulator decreases until, in the extreme, it will vanish. Then, at the latest, the pole-wheel angle regulator takes over and regulates the turbine to prevent further opening of the admittance control members and thus malfunction of the machinery.

In some cases, it is preferable automatically to substitute the individual component regulating circuits for each other not by means of a selectively operating network but by means of a discriminating device operating with controlled switching devices such as electromagnetic relays, switching transistors, controlled rectifiers or the like. Care must then be taken, by suitable correlation of the individual switching components, to have only one of the interlinked component regulating circuits in operation upon the admittance control member at a time.

According to a further feature of our invention, the datum value of the component power regulator is given a share proportional to the difference between the line frequency and the constant reference frequency, for example 50 or 60 c.p.s., thus providing the static regulator characteristic required for parallel operation of synchronous generators.

According to still another feature of the invention, the datum value for the power regulating circuit is passed through a load-change limiting stage before applying the output of the power regulating circuit to the control member that determines the opening of the admittance valve. Thus it is possible to impose upon the turbine only such load changes as will not cause stresses beyond those permissible in the machinery materials. The datum value for the component power regulating circuit can also be limited by a limit member responding to given plant-operation conditions, for example the fresh-steam temperature, the fresh-steam pressure and similar pilot magnitudes, with the effect that the datum value for the power regulation is corrected accordingly with respect to amount and rate of change.

The invention will be further described with reference to the embodiment of a regulating system for a turbine-generator plant illustrated by way of example in the accompanying drawings, in which:

FIG. 5 illustrates an electrohydraulic amplifier shown in FIG. 1a.

Figure 1A:
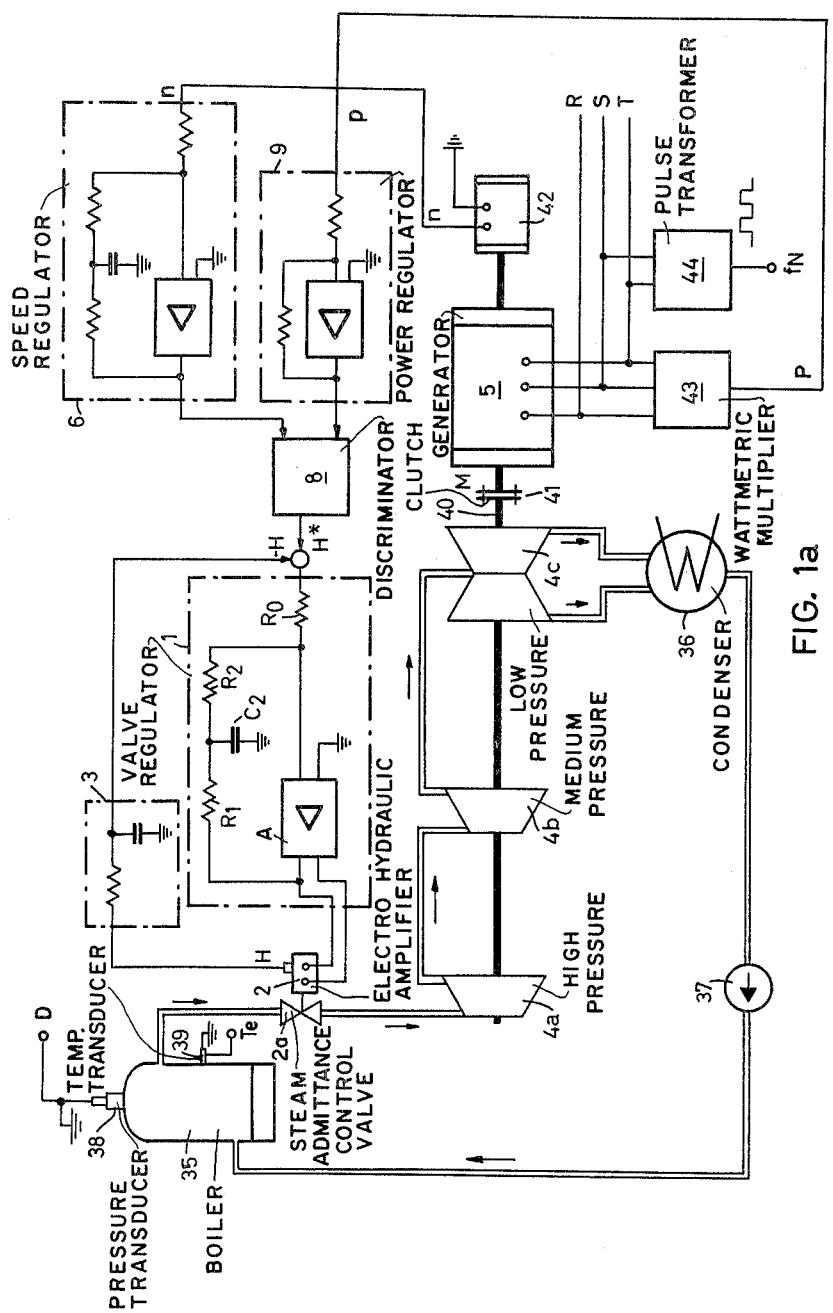
FIG. 1a is a schematic diagram of the power plant equipped with a turbine regulating system.

The power plant illustrated in FIG. 1a comprises a steam-generating boiler 35 which supplies steam through a control valve 2a to the high-pressure portion 4a, the medium-pressure portion 4b and the low-pressure portion 4c of a turbine driving a synchronous generator 5 to furnish three-phase alternating voltage to power-line busses R, S, T. The plant components so far described constitute the "controlled system" or the "forward path" of the control system. The regulating system (feedback path) proper comprises an electric regulator 1 whose output voltage acts upon an electrohydraulic amplifier 2 which operates the steam admittance valve 2a and thus determines the valve opening H for steam supply to the turbine in dependence upon the amplified voltage supplied to the amplifier 2 from the electric regulator 1. The amplifier 2 is more completely shown in FIG. 5. A secondary feedback loop applies a voltage corresponding to the opening H through a smoothing member 3 back to the input circuit of the valve regulator 1. The smoothing member 3 is shown to consist of an RC-combination. The regulator 1 is preferably a PD-regulator, whose time response is adapted in known manner to the sum of the shortest time constants of the subsidiary valve regulating system just described. In some cases, however, the use of a P-type, IP-type or IPD-type regulator is advisable. (Relative to the terminology here employed, reference may be had to "Feedback Control Systems" by Gille, Pelegrin and Decauline, McGraw Hill Book Co., 1959, including the Complementary Notes on pages 771, 772; also German Standards booklet for Regulating Technique DIN 19226.)

In the illustrated embodiment, the valve regulator 1 is of the PD-type and comprises a direct-voltage amplifier A of conventional design whose output voltage is feedback connected with the input through an RC-combination $R_1$, $R_2$, $C_2$. A resistor $R_0$ is series connected in the input circuit of the direct-voltage amplifier A. The valve regulator 1 in conjunction with the electrohydraulic control member 2, 2a determines the steam quantity passing from the boiler 35 to the high-pressure portion 4a of the steam turbine. After subsequently passing through the medium-pressure portion 4b and the low-pressure portion 4c, the steam condenses in a condenser 36 and the water is returned by means of a pump 37 to the boiler 35.

Provided at the boiler 35 is a pressure-sensing transducer 38 and a temperature transducer 39 which provide at their respective terminals D and T$e$ two pilot voltages proportional to boiler pressure and boiler temperature respectively. As will be explained in a later place, these pilot voltages, proportional to the fresh-steam pressure, and the fresh-steam temperature, are available for impressing additional control effects upon the regulation.

The shaft 40 of the steam turbine is connected by a clutch 41 with the shaft of the alternator 5. A tachometer dynamo 42, connected with the turbine shaft and operating as a speed sensor, furnishes a pilot voltage proportional to the rotating speed $n$ of the turbine. Connected to the busses R, S, T of the power line is a wattmetric multiplier 43 which furnishes a voltage proportional to the power P delivered by the alternator. Connected to the phase busses S and T is a pulse transformer 44 which converts in known manner the sinusoidal terminal voltage by amplification and amplitude limitation into rectangular pulse trains of the frequency $f$. The voltages proportional to turbine speed $n$ and to power output P are supplied as pilot inputs to a speed regulator 6 and a power regulator 9 respectively, as will be more fully explained hereinafter with reference to FIG. 1b. The just-mentioned component regulators 6 and 9 consist of feedback-connected direct-voltage amplifiers substantially similar to the regulator 1 described above.

Figure 1B:
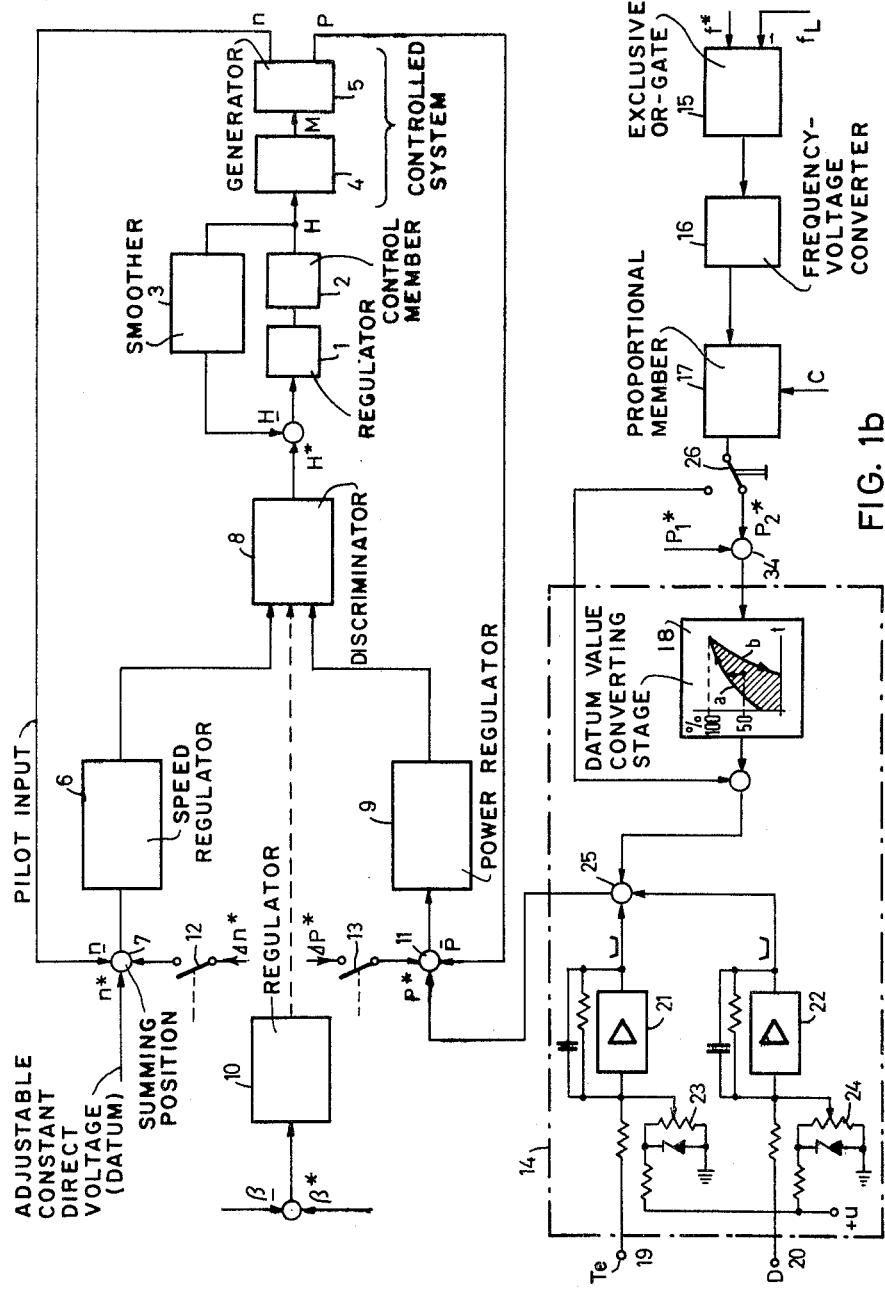
FIG. 1b is a schematic regulator diagram of the block type representing the same system.

In the block diagram of the same system represented in FIG. 1b, the components described above with reference to FIG. 1a are shown in a simplified manner by illustrating not their internal circuitry but their respective step-response or transfer function. FIG. 1b further shows how the input stages of the two component regulators 6 and 9 selectively acting upon the valve-opening control member, are made subject to control by various pilot input magnitudes. It will be seen from a comparison of FIG. 1b with FIG. 1a that the components 4a, 4b, 4c and 35 to 39 are combined in FIG. 1b to a single block symbol 4 which, in conjunction with the generator 5, can be looked upon as constituting the "controlled system" or "forward path" of the entire feedback control system illustrated.

At the output of the block unit 4 there occurs the mechanical moment M which acts upon the machine assembly consisting of a turbine and a synchronous generator. Taken from the generator 5 is a voltage proportional to the turbine speed $n$ and applied at the summing point 7 to the input circuit of the component speed regulator 6 as a pilot input. Also applied to the summing or comparison point 7 is a datum or reference voltage $n^*$ supplied from a source of adjustable constant direct voltage. The speed regulator 6 amplifies the deviation (proportional to pilot input minus reference input) or error voltage (reference minus pilot) and passes the amplified voltage to one of the input leads of a discriminator network 8 whose circuitry will be described by way of example hereinafter with reference to FIG. 3. In an analogous manner, a second input lead of the discriminator network 8 is supplied with voltage from a power regulator 9 which receives deviation (or error) voltage from a summing point 11, the latter voltage being the resultant of a power pilot value P corresponding to the power output of the turbine and a power reference voltage P*. As shown by a broken line, a further component regulator 10 is optionally provided for response to the pole-wheel angle $\beta$ of the alternator 5. Additional datum input magnitudes (voltages) $\Delta n^*$ and $\Delta P^*$ are supplied to the input circuits of the respective component regulators 6 and 9 at the appertaining comparison points 7 and 11, as will be further explained hereinafter.

The datum magnitude P* comprises a constant magnitude P1* which may be furnished for example from a potentiometer connected to a constant direct voltage and having a tap adjustable either manually or by means of a controller connected to the power line or network. The constant datum value P1* passes to the comparison point 11 through a limiter network 14. Added to the datum value P1* is a second datum value P2* which corresponds to a voltage proportional to the difference between the line frequency and a constant frequency of 50 or 60 c.p.s. The second additional datum value P2* is preferably formed by means of a difference gate 15 which compares the constant pulse frequency $f^*$ of a quartz oscillator with a pulse frequency derived from the line frequency, in such a manner that the output of the gate 15 is a pulse sequence whose frequency corresponds to the difference of the two above-mentioned pulse-sequence frequencies. In its simplest form, the difference gate may be designed in the form of a conventional, so-called exclusive-OR-gate whose output circuit furnishes a signal only if a signal is applied to one or the other input lead, but not when both input leads receive signals. In this manner, pairwise arriving signals can be suppressed. The output signal of the difference gate 15 passes through a frequency-voltage converter 16 and a proportional member 17 to the summing point 34. By varying of the controlling influence indicated by C at the proportional member 17, the proportional share can be chosen with which a difference between the reference frequency $f^*$ and the line frequency becomes effective for demanding a corresponding power output, thereby determining the slope of the static frequency-power characteristic. The device 17 designated as proportional member may consist for example of a potentiometer connected across a voltage source of constant voltage. The magnitude C is then the selected voltage determined by the adjusted position of the potentiometer tap.

The mutual substitution performance of the individual component regulator circuits will be described presently.

Figure 2:
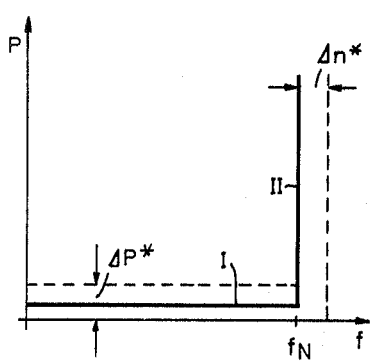
FIG. 2 is an explanatory step-response (transfer function) diagram relating to the regulating system.

Assume first that only the speed regulator 6 and the power regulator 9 according to FIGS. 1a and 1b are to operate in this manner. When the turbine is brought up to rated speed corresponding to synchronism with the frequency of the compound distribution network to which the generator is connected, this starting-up operation taking place under no-load conditions, the regulation of the turbine is to be subject only to speed control by the component speed regulator circuit 6. This stage of operation requires a relatively little energy supply and consequently the small value of the valve lift or opening H. Consequently if an additional datum value ΔP* is imposed upon the component power regulator circuit 9, which additional datum value furnishes to the regulator-controlled valve controller 1 a larger input signal than the component speed regulator 6, then only the output signal of the speed regulator 6 can become effective in the input circuit of the valve controller 1 because of the selective operation of the discriminator 8 which as a so-called minimum-network only permits the smallest of the simultaneously effective input signals to pass through. Thus, the component power regulator circuit 9 is put out of operation, and the turbine is run up to rated speed substantially in accordance with the characteristic denoted by I in the diagram of FIG. 2 representing output power P versus speed as expressed in terms of frequency of the generated alternating current.

When the rated speed, corresponding to the line frequency $f_L$ is reached and simultaneously the synchronous generator is electrically connected in the conventional manner to the line for compound operation, then the additional datum value Δn* is added to the input of the component speed regulator 6. Since the speed of the machinery has now been fixed by the line frequency, the speed regulator 6 now furnishes a signal, i.e. the difference between the total reference or datum value (n*+Δn*) and the speed pilot value n corresponding to the line frequency $f_L$, that exceeds the one coming from the component power regulator 9. In compound operation of the generator, therefore, the component speed regulator 6 is put out of operation in this manner, and the power delivery of the machine circuit is now determined at constant turbine speed by the operation of the component power regulator 9 as is schematically represented in the diagram of FIG. 2 by the characteristic denoted by II.

The component speed regulator circuit 6 is preferably an I-type or PI-type regulator. However a proportional regulator (T-type) can also be employed. Since for compound operation the plant generally operates in connection with the frequency-rigid power line and during these prolonged periods of time the component speed regulator is to remain ineffective, it would be necessary that, when employing a proportional regulator, the additional datum value Δn* has a sufficiently large long-time constant. However, when using an I-regulator or PI-regulator, this requirement is avoided to a great extent because the output signal of a regulator having integrating performance attains a given fixed maximum value even with a smallest input signal continuously departing from zero.

It will now also be understood from the foregoing how the regulating system according to FIG. 1b will operate in other possible cases of turbine operation. In the event of load failure, that is, when the synchronous generator is suddenly separated from the compound distribution network, it is again necessary to operate only with speed regulation. The additional datum value Δn*, therefore, is switched off by a switch 12, and the additional datum value ΔP* is added by the switch 13. The switches 12 and 13 are preferably actuated automatically in dependence upon the amount or the gradient of the change in output power. The switches 12 and 13 may also form contacts of, or be controlled by, a relay responding to sudden changes in load or to sudden drop or failure of voltage, devices of this kind being generally known and commercially available.

When operating upon a non-rigid distribution network or when the synchronous generator operates alone upon its own distribution network, then the additional datum value Δn* is switched off and thus the component power regulator 9 put out of operation. If in the two latter cases of operation it becomes necessary to operate in accordance with static speedpower characteristics, then the component speed regulator 6 can be given a proportional behavior by the addition of known secondary feedback means unless it already possesses a proportional control characteristic.

The limiter network 14 connected in the circuit for supplying the power reference quantities permits those control quantities which are essential to the specific characteristic of over-all performance desired to become effective in the regulating system. In the illustrated embodiment of the limiter network there is provided a datum-value converting stage 18 which determines the permissible time change of the turbine load in accordance with a characteristic of the scissors type as schematically shown in the block symbol 18 (FIG. 1b). The ordinate of the diagram indicates load changes in percent of the rated load, and the abscissa denotes time ($t$). An instantaneous change in load and hence an immediate transmission of the corresponding datum command through the unit 18 is possible within the range of percentages identified by broken lines. When the limit curve $a$ or $b$ is reached, the datum value, as it passes through the unit, is given a delay in accordance with the respective curves.

For explaining the functioning of the converting stage 18, of which an example will be described hereinafter with reference to the circuit diagram of FIG. 4, assume that the synchronous generator is just delivering one-half of its rated power. The output signal of the datum-quantity converter 18 is then likewise at 50% of its control range. Assume now that a command is given requiring the turbine to deliver its full rated load. Such a command may be imposed upon the system by suddenly changing the datum value P1*. When this occurs, the output signal of the datum converter 18 would at first change only up to the value determined by the limit curve $a$ which, in the illustrated diagram, corresponds to approximately 75% rated load. Thereafter the converted datum signal issuing from the converter 18 would slowly increase according to the datum-value curve $a$ until the full datum value corresponding to 100% rated load is reached. The characteristic of the scissors-type diagram exemplified in block 18 is to be adapted in each particular case to the turbine being employed. As will be shown below, such a datum-value converter may consist of a direct-current amplifier network containing RC-members whose active time constants are dependent upon the magnitude and change of the input signal. The desired conversion in unit 18, however, may also be obtained by means of proportional amplifiers provided with correspondingly dimensioned auxiliary feedback loops of the delaying (PD-regulator) or yielding (PI-regulator) type.

The limiting stage 14 according to FIG. 1b provides for the further possibility of influencing the datum value P* in the event of certain criteria potentially dangerous to the power plant. For this purpose, in the illustrated embodiment, two voltages Te and D are impressed upon the respective input terminals 19 and 20 of two amplifiers 21 and 22 of the same design. The voltage Te corresponds to the fresh-steam temperature and is taken from the correspondingly denoted terminal of the temperature sensor 39 shown in FIG. 1a. The voltage D corresponds to the fresh-steam pressure at the boiler outlet and is taken from the correspondingly denoted terminal of the pressure transducer 38 shown in FIG. 1a. In the limiter stage 14 (FIG. 1b), the two voltages Te and D are compared with respective limit values adjustable by means of potentiometers 23 and 24. It is essential that due to the unilateral output limitation of the amplifiers 21 and 22 a corrective action upon the regulation takes place only when the sensor signal voltages Te, D depart downwardly or upwardly from the mentioned limit values. In this case, an additional datum-value signal occurs in the output circuit of the particular amplifier and has a polarity which, in dependence upon the departure of the sensor signal from the adjusted limit value, is directed toward reducing or increasing the opening H of the steam control valve. It is of advantage to provide each amplifier 21 and 22 with a combined resistance capacitance or RC negative feedback as shown in order to impart to the amplifying performance a time delay to provide a gradual initiation of the resulting corrective datum value P*.

If desired, the limiting stage 14 in a regulating system according to FIG. 1b can readily be supplemented for response to additional plant-operation criteria by providing for each of these criteria a further amplifier corresponding to those denoted by 21 and 22, and passing the output of this amplifier from the summing point 25.

As mentioned, the datum value P2* serves to hold in readiness a share of power datum value for such cases in which the frequency of the compound distribution network departs from its rated frequency, for example due to lack of balance between consumption and generation. In individual cases it is advisable or necessary to have such an auxiliary control influence become immediately effective independently of its magnitude. For this purpose the system shown in FIG. 1b is provided with a switch 26 that permits bypassing the datum-signal converter 18 so that the value of P2* is imposed upon the summing point 25 or, in the absence of Te- and D-signals, upon the summing point 11. As a result, an unlimited support of the compound-network frequency by the turbine can always be effected by actuating the switch 26.

Figure 3:
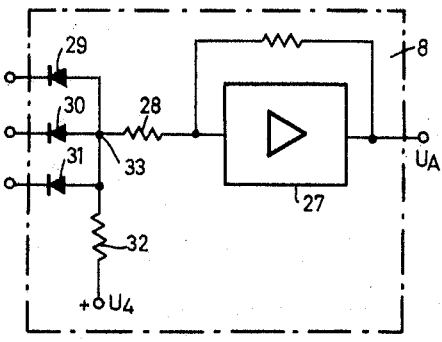
FIG. 3 is the schematic circuit diagram of a discriminator stage which forms part of the regulating system of FIGS. 1 (a and b) and 2.

FIG. 3 shows an example of circuitry for the discriminator 8 applicable in the regulating system of FIGS. 1a, 1b. Denoted by 27 in FIG. 3 is a proportional amplifier which is to amplify only the smallest one of the three indicated input voltages $U_1$, $U_2$, $U_3$ and to furnish a proportionally amplified output voltage $U_A$. Connected in the input circuit of the amplifier 27 is a resistor 28 in series with three cathodically interconnected diodes 29, 30, 31 and a resistor 32 which connects the common cathode lead of the diodes with a constant positive direct voltage $U_4$ which in any case is given a larger value than that of the positive voltages $U_1$, $U_2$ and $U_3$. It will be recognized that, with negligible forward resistance of the diodes 29 to 31, the terminal point 33 always assumes the potential determined by the smallest one of the three input voltages.

Figure 4:
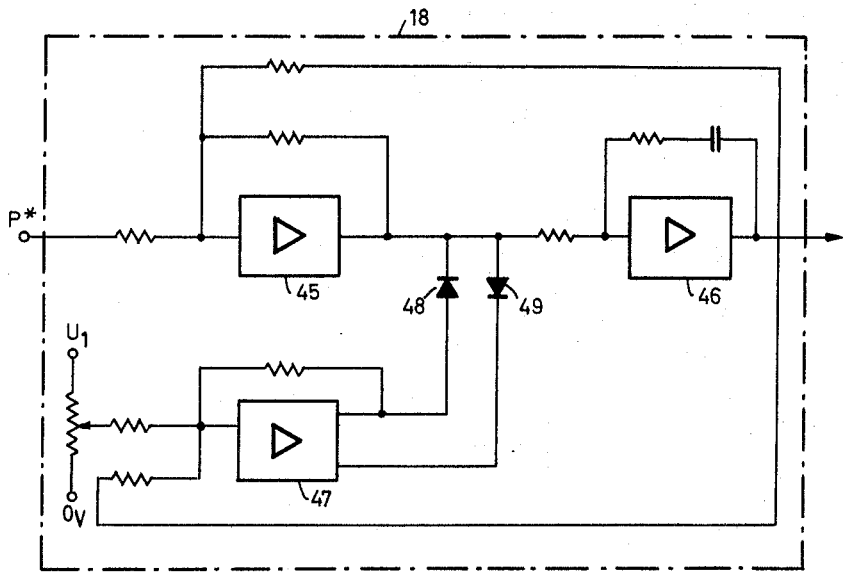
FIG. 4 is the schematic circuit diagram of a datum-value converting stage also forming part of the regulating system.

The particular datum-signal converter 18 exemplified in FIG. 4 may also be considered as constituting a load-change limiting device. It consists essentially of three amplifiers 45, 46, 47 with respective feedback loops which preferably contain transistors as amplifying elements. The negative feedback couplings are so designed that the proportional amplifier 45 has a large amplifying gain, and the proportional amplifier 47 has a small gain, whereas the amplifier 46 exhibits a proportional and integral (PI-type) function. The time constant of the amplifier 46 is in the order of magnitude of a few minutes for adaptation to the conditions involved in turbine regulation. Two diodes 48 and 49 limit the input signal of the amplifier 47 in both directions. The datum value P* is applied to the input circuit of the amplifier 45. The voltage at the input circuit of amplifier 46 is taken from a potentiometer energized with the constant voltage $U_1$. The output signal of amplifier 46 is feedback-connected with the input signals of the amplifiers 45 and 47. The combination of amplifier 46 with amplifier 45 operates as a resultant amplifier of proportional and integral performance whose output signal increases in linear proportion to time in accordance with the integrating time of the amplifier, up to a value determined by P*. Due to the performance of amplifier 47, the linear increase in the output signal of amplifier 46 is converted in an increase corresponding to an exponential function, this being schematically exemplified by the diagram in the box symbol at 18 in FIG. 1b.

Figure 5:
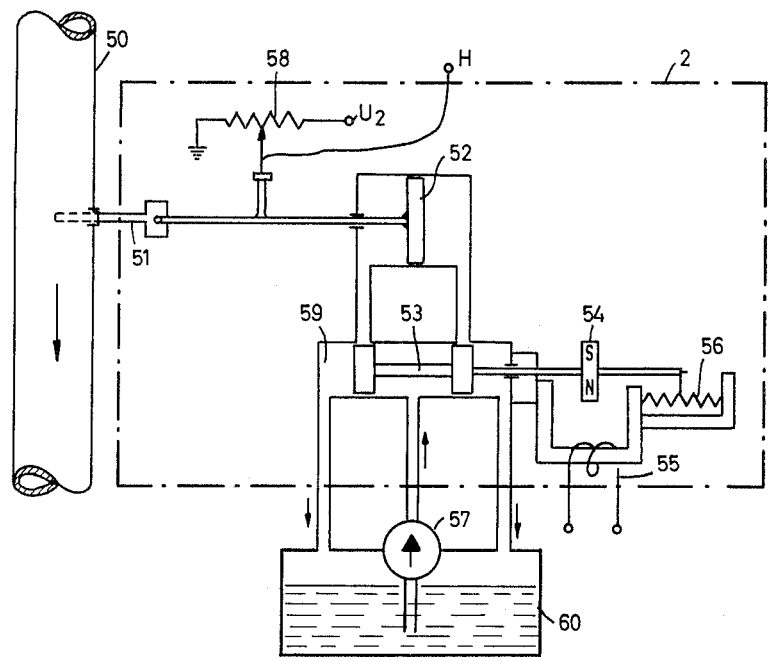

FIG. 5 illustrates an embodiment of an electrohydraulic amplifier as identified in FIG. 1a by the reference numeral 2. Steam flows in the tubular conductor 50 to the turbine. A slide 51 for throttling the steam can be moved by pressurized oil by means of the stationary (datum) piston 52 according to the position of the control piston 53. A permanent magnet 54 couples with the control piston 53 and is located in the field of a coil 55 which is opened by the output voltage of the valve regulator 1. According to the polarity of this voltage, the north pole N of this permanent magnet and thereby the control piston 53 is moved to their right or left againset the force of a spring 56 biasing it to the middle position. Thus the path for the necessary pressurized oil from the pump 57 to one of the two surfaces of the piston 52 is released and a corresponding displacement of the slider 51 occurs. The position of the slider 51 is sensed by a tap of a potentiometer 58, moving with the piston rod, in the form of an electrical voltage, and applied to the input of an opening regulator. The potentiometer 58 is energized with a constant voltage. The ends of the control cylinder 59 are coupled with the oil container 60 by means of a tube conductor.

To those skilled in the art it will be obvious upon a study of this disclosure that turbine regulating systems according to our invention permit of a great variety of

We claim:

1. In a power plant having a turbine, an electric generator coupled to and synchronously driven by said turbine, power medium supply means connected to said turbine, and control means for controlling the admittance of said power medium to said turbine, the combination of a turbine regulating system comprising a plurality of sensor means responsive to given respective operating criteria of the plant, one of said sensor means being responsive to the speed of said generator and another one of said sensor means being responsive to the power output of said generator, an electrohydraulic actuator coupled with said control means and having electric means for controlling the operation of said control means, at least two component feedback regulator circuits connected to said electric means of said actuator, one of said regulator circuits having an output and an input connected to said speed-responsive sensor means for speed regulation of said turbine, the other of said regulator circuits having an output and an input connected to said power-responsive sensor means for regulating the delivered power of said turbine, and discriminator means connected between the outputs of said component feedback regulator circuits and the electric means of said actuator for selectively connecting one of said regulator circuits to and simultaneously disconnecting the other of said regulator circuits from the electric means of said actuator in dependence upon given plant-operation conditions.

2. In a turbine regulating system as claimed in claim 1, wherein said discriminator means comprises a minimum-selector network having a plurality of inputs connected to the outputs of said respective component feedback regulator circuits for receiving respective output signals from said regulator circuits and an output circuit connected to the electric means of said actuator whereby said discriminator means passes only the smallest one of said signals to said electric means of said actuator.

3. In a turbine regulating system as claimed in claim 1, wherein said discriminator means comprises a proportional amplifier having an output connected to the electric means of said actuator and a resistive input circuit, a plurality of diodes connecting said component regulator circuits in parallel and with the same polarity to the input circuit of said proportional amplifier, said input circuit of said amplifier comprising a resistor and a source of constant direct voltage connected in series with said resistor, said direct voltage source being connected to said diodes with a relative polarity for supplying only the lowest output signal from said component feedback regulators to said amplifier.

4. In a turbine regulating system as claimed in claim 1, wherein each of said component feedback regulator circuits includes reference voltage means providing a normal reference magnitude for comparison with a pilot signal from the corresponding one of said sensor means, and means for superimposing an additional constant reference magnitude on said normal reference magnitude.

5. In a turbine regulating system as claimed in claim 1, wherein said generator comprises a synchronous alternator, said sensor means of said system further comprising a third one of said sensor means having a pilot voltage indicative of the pole-wheel angle of said synchronous alternator, and a further component feedback regulator circuit having an input connected to said angle-responsive sensor means and an output connected to said discriminator means, said discriminator means selectively connecting one of said regulator circuits to and simultaneously disconnecting the others of said regulator circuits from the electric means of said actuator.

6. In a turbine regulating system as claimed in claim 1, further comprising a power line connected to said generator and wherein each of said component feedback regulator circuits includes reference voltage means providing a normal reference magnitude for comparison with a pilot signal from the corresponding one of said sensor means, the reference voltage means of said power regulating circuit having two parts of which a first part is adjustable to a constant reference voltage and a second part provides a voltage proportional to the difference of the frequency of the power line from a given fixed frequency.

7. In a turbine regulating system as claimed in claim 1, further comprising condition-responsive reference-voltage supply means connected to said power regulating circuit to provide a reference voltage for comparison with a pilot voltage from said power-responsive sensor means, and a load-change limiter stage interposed between said reference-voltage supply means and said power regulating circuit.

8. In a turbine regulating system as claimed in claim 6, further comprising a load-change limiter stage interposed between said power regulating circuit and the reference voltage means of said power regulating circuit.

9. In a turbine regulating system as claimed in claim 8, wherein said power medium comprises steam and said power medium supply means comprises a steam boiler, said plurality of sensor means includes boiler-condition responsive sensors, said limiter stage includes respective amplifiers connected to said boiler-condition responsive sensors, said amplifiers having respective output circuits with unilateral limiting means connected to said power regulating circuit so as to reduce the resultant reference input magnitude for said power regulating circuit when the respective sensed boiler conditions exceed given limit magnitudes.

10. In a turbine regulating system as claimed in claim 6, further comprising a load-change limiter stage interposed between said power regulating circuit and the first part of said reference voltage means, the second part of said reference voltage means being connected to said power regulating circuit independently of said limiter stage.

References Cited by the Examiner

UNITED STATES PATENTS

| | | | |
|---|---|---|---|
| 2,707,866 | 5/1955 | Noon et al. | 137—26 X |
| 2,909,779 | 10/1959 | Emery et al. | 290—40 X |
| 3,077,739 | 2/1963 | Krussmann | 137—29 X |
| 3,091,933 | 6/1963 | Wagner et al. | 137—29 X |
| 3,097,488 | 7/1963 | Eggensberger et al. | 137—26 X |
| 3,097,489 | 7/1963 | Eggensberger et al. | 137—26 X |
| 3,109,102 | 10/1963 | Jenkins | 290—40 X |

ORIS L. RADER, *Primary Examiner.*

G. SIMMONS, *Assistant Examiner.*